United States Patent [19]

Wright

[11] 4,151,899
[45] May 1, 1979

[54] MOUNTING ASSEMBLY FOR A DISC BRAKE CALIPER ARRANGEMENT

[75] Inventor: Andrew C. W. Wright, Lapworth, England

[73] Assignee: Girling Limited, Birmingham, England

[21] Appl. No.: 802,809

[22] Filed: Jun. 2, 1977

Related U.S. Application Data

[63] Continuation of Ser. No. 626,184, Oct. 28, 1975, abandoned.

[30] Foreign Application Priority Data

Nov. 5, 1974 [GB] United Kingdom ............... 47710/74

[51] Int. Cl.² .............................................. F16D 65/02
[52] U.S. Cl. .................................... 188/73.3; 188/73.5
[58] Field of Search ................... 188/71.1, 72.4, 73.3, 188/73.4, 73.5, 73.6

[56] References Cited

U.S. PATENT DOCUMENTS

| | | | |
|---|---|---|---|
| 3,375,906 | 4/1968 | Hayes | 188/73.3 |
| 3,495,689 | 2/1970 | Peach | 188/72.4 |
| 3,628,639 | 12/1971 | Daley | 188/73.3 |
| 3,805,925 | 4/1974 | Schoenhenz | 188/73.3 |
| 3,848,709 | 11/1974 | Tourneur | 188/73.3 |
| 3,899,052 | 8/1975 | Burnett et al. | 188/73.4 |
| 3,917,032 | 11/1975 | Hoffman et al. | 188/73.3 |
| 3,930,564 | 1/1976 | Kabayashi et al. | 188/73.3 |
| 3,942,611 | 3/1976 | Burnett | 188/73.3 |
| 3,949,839 | 4/1976 | Girauldon | 188/71.1 |
| 3,976,169 | 8/1976 | Ogawa | 188/73.3 |
| 3,998,296 | 12/1976 | James | 188/73.3 |

FOREIGN PATENT DOCUMENTS 1108916  4/1968  United Kingdom ................... 188/73.3

*Primary Examiner*—Edward R. Kazenske
*Attorney, Agent, or Firm*—Scrivener, Parker, Scrivener & Clarke

[57] ABSTRACT

In a vehicle disc brake of the single sided sliding reaction caliper type the drag on the friction pad assemblies is taken by a drag-taking member. The caliper is slidably mounted for movement relative to the disc on a guide in the form of a single pin which is located on the same side of the disc as that on which an actuator for the brake is located.

19 Claims, 9 Drawing Figures

MOUNTING ASSEMBLY FOR A DISC BRAKE CALIPER ARRANGEMENT

This is a continuation of application Ser. No. 626,184, filed Oct. 28, 1975 now abandoned.

This invention relates to disc brakes for vehicles of the kind in which a caliper is adapted to straddle both the peripheral edge of a rotatable disc and friction pad assemblies for engagement with opposite faces of the rotatable disc which are guided for movement with respect to the disc on spaced drag-taking abutment surfaces in a relatively stationary drag-taking member, and actuating means housed in the caliper on one side of the disc are adapted to apply the adjacent friction pad assembly known as the "directly actuated friction pad assembly" directly to the adjacent face of the disc, the other friction pad assembly known as the "indirectly actuated friction pad assembly" being applied to the opposite face of the disc by the reaction on the caliper which is adapted to cause the caliper to move in a direction substantially parallel to the axis of the disc to transmit the force from the actuating means indirectly to the actuated friction pad assembly.

In one known disc brake of the kind set forth the actuating means and the caliper itself are positively coupled to the directly and indirectly actuated friction pad assemblies respectively. In the application of the brake the caliper and the pad assemblies are moved in a circumferential direction and, due to the relatively high inertia forces dependant upon the mass of the caliper, the engagement of the pad assemblies with the abutment surfaces in the drag-taking member is liable to be noisy, particularly when the pad assemblies move from the abutment surfaces at one end of the brake to the abutment surfaces at the other end of the brake due to a change in the direction of disc rotation. Also, unless the caliper is symmetrically arranged on both sides of the disc, there is a tendency for the caliper to rattle and pivot with respect to the disc in the "off" position of brake. Any such movement is transmitted to the pad assemblies and may cause tapered wear of the pad assemblies to occur. Also when the actuating means comprises a piston working in an hydraulic cylinder in the caliper, such movement of the caliper may cause the piston to be "knocked back" into the bore with the result that an increased pedal travel is required on a subsequent brake application. Again, since the sole support for the caliper comprises the couplings with the friction pad assemblies, as the pad assemblies wear, the effective distance between the supports decreases progressively, thereby reducing the stability of the caliper and increasing any tendency for the caliper to rattle and pivot with respect to the disc as described above. Where tapered wear of the pad assemblies occurs, since there is thus no restraining effect to prevent such tapering which may be excessive, the caliper itself may tilt with respect to the disc by a corresponding excessive amount. Furthermore, when the actuating means comprise a piston working in an hydraulic cylinder in the said one limb, the support length of the piston decreases with wear of the pad assemblies and the inertia effects of the mass of the caliper progressively increase any tendency for the piston to be displaced in a direction inclined with respect to the axis of the cylinder, which may displace the material of a piston seal and allow the ingress of air into the cylinder and, in consequence, into the hydraulic fluid of the system.

According to our invention in a disc brake of the kind set forth for vehicles the caliper is slidably mounted for movement relative to the disc on a guide located at one circumferential position on one side only of the disc, the said one side being the same side of the disc as that on which the actuating means is located.

Preferably, the caliper is guided on the said one side of the disc on a single pin located in the drag-taking member in which it may be rigidly secured. Conveniently the pin is position within the peripheral edge of the disc.

By locating the caliper on one side of the disc directly with respect to the drag-taking member serves to minimise rattle and swinging movement of the caliper in the "off" position of brake to eliminate substantially accidental uneven wear of the pad assemblies.

Conveniently the caliper itself is connected to the indirectly actuated friction pad assembly by means of a suitable coupling so that the engagement of that pad assembly with one of the drag-taking abutment surfaces defines the guide location for that side of the disc.

The effective distance between coupling and the guide remains constant throughout the wear life of the pad assemblies.

The guide incorporates resilient means constructed and arranged to permit the indirectly actuated friction pad assembly to move from one abutment surface to the other when the brake is applied with the direction of disc rotation reversed. The resilient means absorbs a high proportion of the inertia effects due to the mass of the caliper when the brake is applied so that the operation of the brake is less noisy than in constructions in which the whole inertia of the caliper is transmitted to both friction pad assemblies.

The pin may comprise a sleeved bolt with resilient means comprising a resilient bush being disposed between the sleeve and the caliper. Conveniently the bush is also sealingly connected to the sleeve by means of sealing boots to protect the slide and maintain the seal when the bolt is withdrawn from the sleeve for brake maintenance, for example friction pad replacement. In a modification the sleeve may be omitted and the bolt projects through the resilient bush. In another construction the bush may be replaced by at least one annular resilient ring.

When the drag-taking member is mounted on a separate stationary part adjacent to the disc, conveniently the bolt passing through the sleeve may form one of a pair of circumferentially spaced mounting bolts for securing the drag-taking member to the stationary part. This has the advantage that the drag-taking member is still held in position when the caliper is removed for brake maintenance.

Some embodiments of our invention are illustrated in the accompanying drawings in which.

Figures 1, 2:
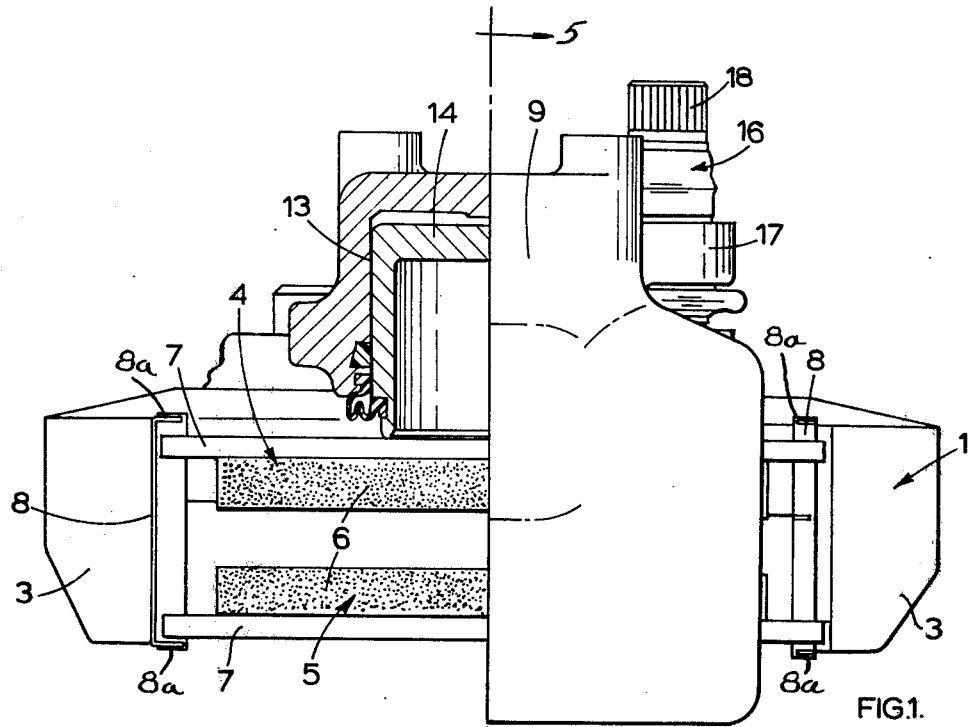
FIG. 1 is a plan view of a caliper type disc brake for a motor car with a portion of the caliper omitted for clarity.
FIG. 2 is an end view of the brake showing alternate constructions of drag-taking member.
Figure 3:
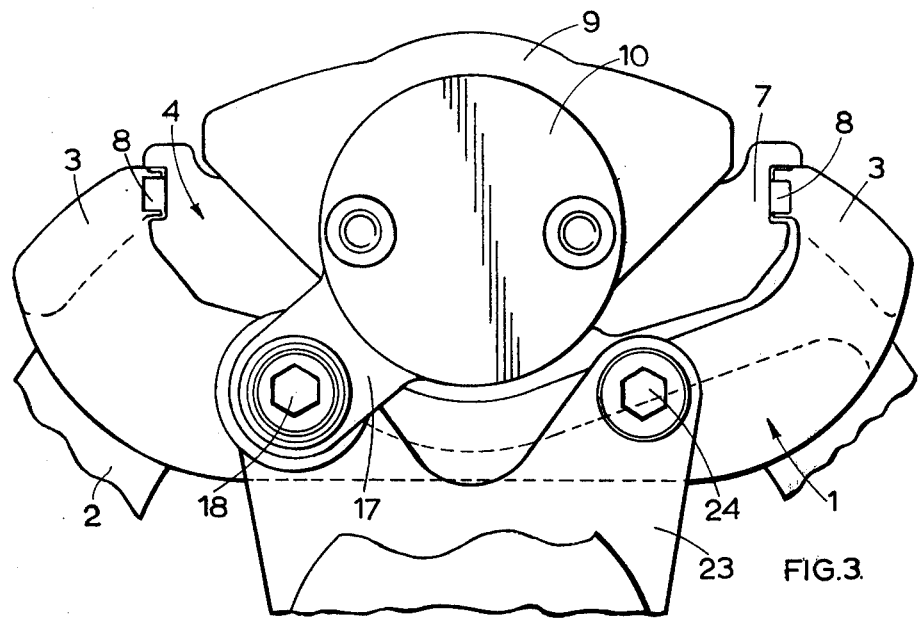
FIG. 3 is a view of the opposite ends of the brake.
Figure 4:
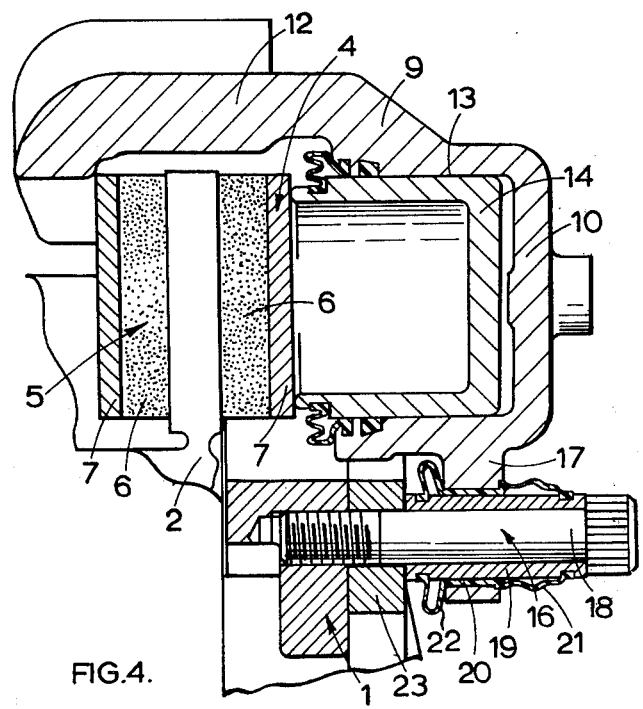
FIG. 4 is a section on the line 4—4 of FIG. 2.
Figure 5:
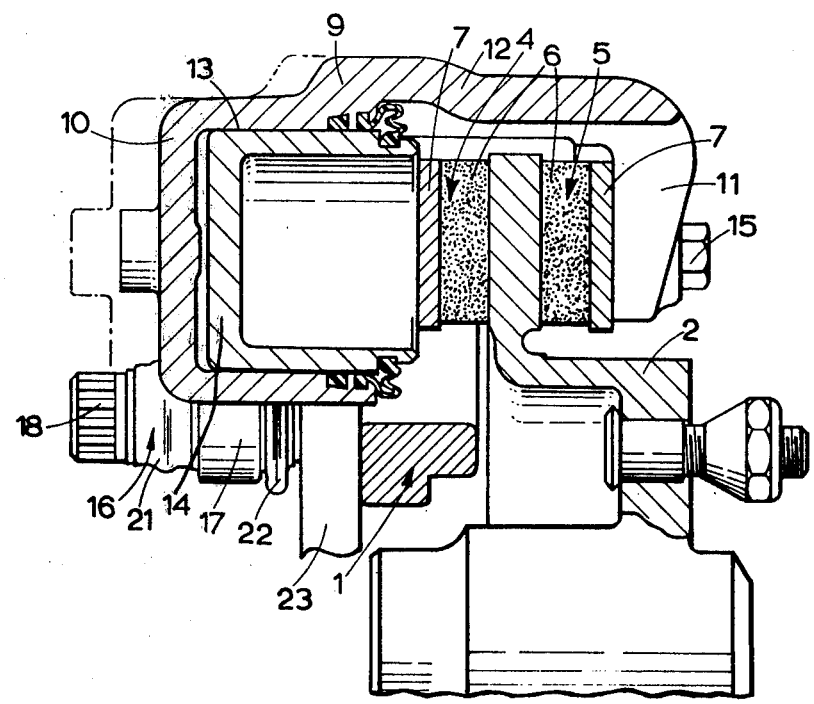
FIG. 5 is a longitudinal section through the brake, substantially on the line 5—5 of FIG. 1.

In the caliper-type disc brake illustrated in the drawings 1 is a drag-taking member of cast construction which is disposed adjacent to one face of a rotatable disc 2 and includes a pair of circumferentially spaced parallel arms 3 which extend over the peripheral edge of the disc by a substantial distance. In a modification the drag-taking member may be of pressed-metal construction.

Friction pad assemblies 4 and 5 for engagement with opposite faces of the disc 2 are mounted in the gap between the arms 3. Each friction pad assembly 4, 5 comprises a pad 6 of friction material carried by a rigid backing plate 7, and the lugs at the ends of the backing plates are provided with outwardly directed notches which slidably receive the arms 3. Anti-rattle blade springs 8 enclose the arms 3 and serve to bias the friction pad assemblies away from the arms 3 which comprise drag-taking abutment surfaces. The blade springs 8 are of channel section to embrace the sides of the arms, and lugs 8a at the ends of the channel sections are bent over to engage with the ends of the arms.

A rigid caliper 9 of generally U shaped outline fits over the pad assemblies 4 and 5 and straddle the peripheral edge of the disc 2. The caliper 9 comprises space limbs 10 and 11 which are interconnected by an integral bridge piece 12. The limb 10 includes an hydraulic cylinder 13 in which works a piston 14 comprising actuating means for applying the directly actuated friction pad assembly 4 directly to the adjacent face of the disc, and the limb 11 acts on the friction pad assembly 5 to apply it to the opposite face of the disc by the reaction on the caliper 9 which causes it to move in a direction parallel to the axis of the disc.

In accordance with our invention the caliper 9 is slidably mounted for movement relative to the disc 2 on a guide located on the same side of the disc 2 as the cylinder 13. The guide comprises a pin assembly 16 on which a radial boss 17 integral with the limb 10 is slidably guided. The pin assembly 16 comprises a bolt 18 projecting through a sleeve 19 and screwed into the drag-taking member 1. A resilient bush 20 is disposed between the sleeve 19 and the boss 17 and the bush 20 incorporates oppositely extending boots 21 and 22 which make seals with parts of the sleeve 19 on opposite sides of the lug 17.

When the drag-taking member 1 is separate from a stationary part 23 of the vehicle to which it is attached, as shown in the drawings, the bolt 18 also comprises one of a pair of circumferentially spaced bolts of which the other is shown at 24 for attaching the drag-taking member 1 to the stationary part 23. Thus upon removal of the bolt 18 for brake maintenance the bolt 24 will still provide a mounting for the drag-taking member 1.

The drag-taking member 1 may be integral with the stationary part so that, as shown in the left hand view of FIG. 2, the bolt 24 can be omitted.

The limb 11 is positively connected to the indirectly actuated friction pad assembly 5 by circumferentially spaced bolts 15 which are screwed into tapped holes in the backing plate 7. Thus a guide location on the side of the disc remote from the cylinder 13 comprises the sliding engagement between the backing plate 7 of the friction pad assembly 5 and the arms 3.

When the brake is applied the friction pad assemblies 4 and 5 are carried around with the disc and into engagement with the arm 3 at the forward end of the brake. This movement of the indirectly actuated friction pad assembly 5 is accompanied by a corresponding movement of the caliper 9 which takes place against the loading of the resilient bush 20 which, in turn, at all times to maintain the caliper 9 in a position parallel to the axis of the disc.

The coupling between the pad assembly 5 and the caliper 9 prevents the caliper from rotating relative to the stationary member when the brake is applied.

Small radial and circumferential clearances are provided between the arms 3 and the notches in the backing plates 7. The clearances are chosen to minimise rattle in the "off" position of brake and to enable the pad assemblies 4 and 5 to change drag-taking abutments with a change in the direction of disc rotation. This has the advantage that the arms 3 forming the guides for the pad assemblies 4 and 5 are self-cleaning.

When the brake is installed in a vehicle the bolt 18 is mounted in an inboard position chosen so that only a minimum amount of metal is necessary in the boss 17.

Preferably the bush 20 has a splined engagement on the sleeve 19. This has the effect of varying the resilient resistance to movement as the material of the bush deforms.

In a modification the sleeve 19 may be omitted and the pin assembly 16 comprises a bolt projecting through the resilient bush 20.

In either construction, the caliper may be disposed between a part of the stationary member and the disc so that the bolt is disposed in the opposite direction.

Figure 6:
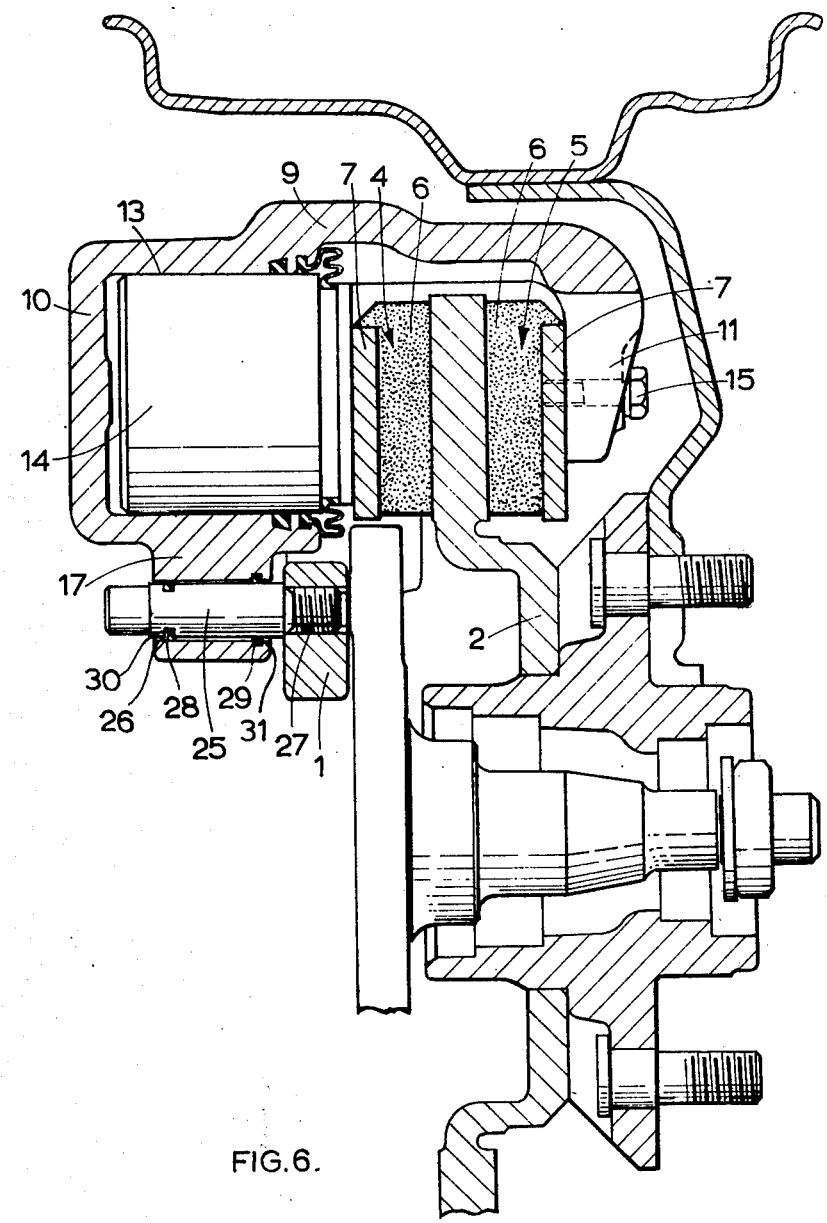
FIG. 6 is a section similar to FIG. 4 but through another brake.

In the brake illustrated in FIG. 6 the pin assembly 16 comprises a pin 25 which projects through a clearance opening 26 in the boss 17 and is screwed at its threaded inner end into a tapped opening 27 in the drag-taking member 1. A pair of axially spaced resilient annular rings 28 and 29 replace the bush and are disposed between the pin 25 and the opening 26. As illustrated the abutment ring 28 projects radially from a groove 30 in the pin 25 and engages with the wall of the opening 26, and the innermost ring 29 projects radially from a groove 31 in the wall of the opening 26 and encircles the pin 25 with which it engages.

The construction and operation of the brake of FIG. 6 is otherwise the same as that of FIGS. 1 to 5 and corresponding reference numerals have been applied to corresponding parts.

Figure 7:
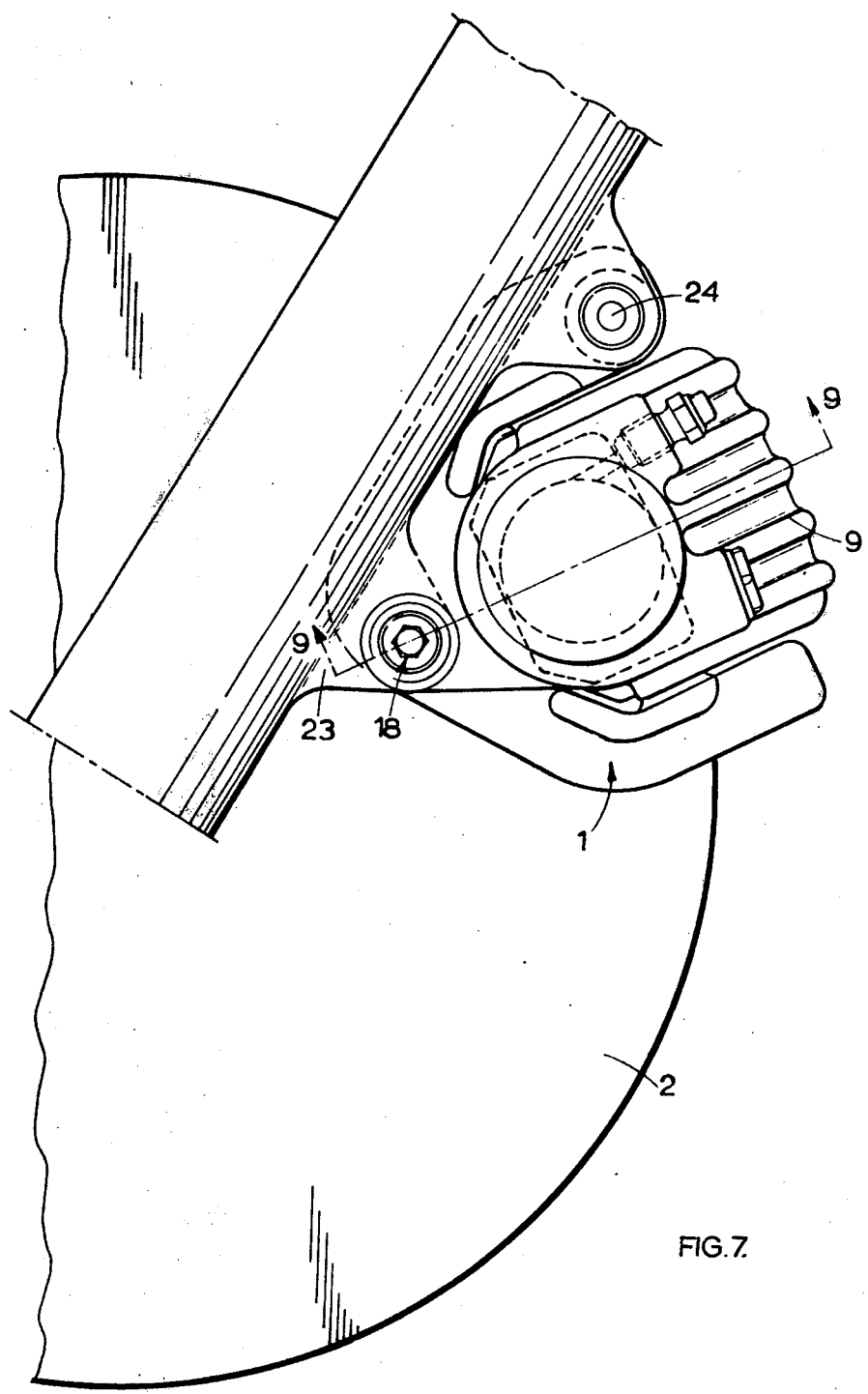
FIG. 7 is an end view of a further brake for a motor cycle.
Figure 8:
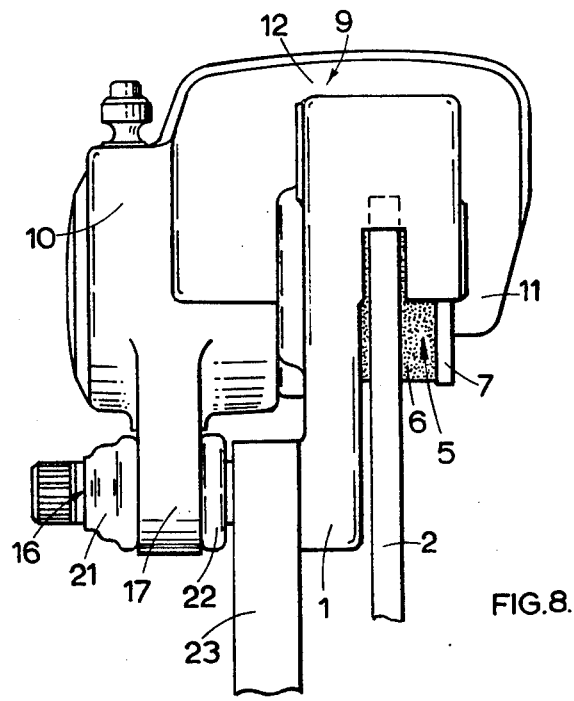
FIG. 8 is a side view of the same.
Figure 9:
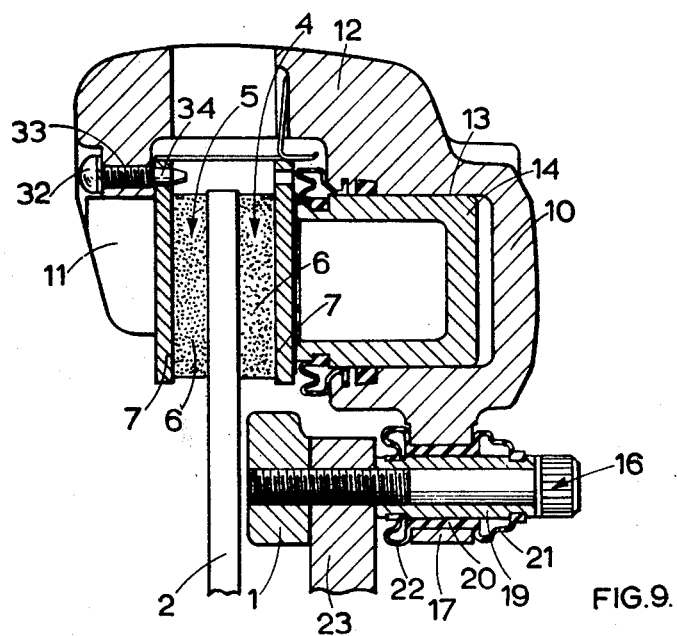
FIG. 9 is a section substantially on the line 9—9 of FIG. 7.

In the brake illustrated in FIGS. 7-9, the limb 11 of the caliper 9 is coupled to the indirectly actuated friction pad assembly by means of circumferentially spaced bolts 32 which are screwed through tapped holes 33 in the limb 11 and are received at their free plane ends in openings 34 in the backing plate 7. Thus a small degree of limited movement may be permitted between the caliper 9 and the indirectly actuated friction pad assembly due to any clearance between the bolts and the openings 34.

The pin assembly 16 is disposed on a disc diameter passing through the axis of the cylinder 13.

The construction and operation of the brake of FIGS. 7 to 9 is otherwise the same as that of FIGS. 1 to 5 and corresponding reference numerals have been applied to corresponding parts.

In the brakes illustrated above the arms 3 are spaced widely apart. This improves the location of the pad assemblies 4 and 5 and, through the indirectly actuated friction pad assembly 5, improves the location of the caliper 9. Since the arms are spaced widely apart the points of contact between the pad assemblies 4 and 5 and the arms 3 lie on tangents passing substantially through the centres of pressure of the friction pads 6.

Since the caliper 9 is coupled to the indirectly actuated friction pad assembly 5 the arms 3 can simply extend over the peripheral edge of the disc and it is not necessary for them to be provided with radial extensions which otherwise might be necessary to support the indirectly actuated friction pad assembly 5 in the brake. This has the advantage that installation of the brake is facilitated since there are no arm extensions which otherwise might impede assembly, particularly when it is desired to form the drag-taking member 1 as part of the same component as the suspension structure, usually called the "upright".

I claim:

1. A disc brake for a vehicle comprising a rotatable disc, a relatively stationary drag taking member located adjacent said disc and having circumferentially spaced arms extending over the periphery of said disc and each including a drag-taking abutment surface, an anti-rattle blade spring means enclosing the abutment surface of each said arm, first and second friction pad assemblies for engagement with opposite faces of the disc, each of said assemblies having circumferentially spaced parts slidably engaging the blade spring means enclosing the respective abutment surfaces of said arms of said drag taking member and being guided for movement with respect to said disc between said arms on said blade spring means which transmit to said abutment surfaces the drag on both said pad assemblies when said brake is applied, a caliper member straddling both the peripheral edge of said disc and said friction pad assemblies, a limb of said caliper member acting on said second friction pad assembly, actuating means housed in said caliper member on one side of said disc for applying said first friction pad assembly directly to an adjacent face of said disc, guide means on said one side of said disc for slidably mounting said caliper member on said drag-taking member for movement relative to said disc, said guide means comprising only a single element located at one circumferential position on said one side of said disc and within the periphery thereof, said caliper member being slidably mounted on said single element for movement relative to said disc in a direction parallel to the axis thereof whereby said second friction pad assembly is adapted to be applied to said disc through said limb by the reaction of said caliper member to said actuating means, said element being secured to one of said members and extending into an opening in the other of said members, and guiding and anti-rotation means for said caliper member on the side of said disc opposite said one side comprising a coupling between said limb of said caliper member and said second friction pad assembly.

2. A disc brake as claimed in claim 1, wherein said single element is located in said drag taking member.

3. A disc brake as claimed in claim 2, including a separate stationary part adjacent to said disc, wherein said drag-taking member is mounted on said separate stationary part, and said element consists of one of a pair of spaced mounting bolts for securing said drag taking member to said stationary part.

4. A disc brake as claimed in claim 1, wherein said coupling comprises at least one bolt screwed into a tapped hole in said second friction pad assembly positively to retain said pad assembly against movement with respect to said caliper member.

5. A disc brake as claimed in claim 1, wherein said coupling comprises at least one bolt having a plane free end, and said bolt is screwed through a tapped hole in said caliper member and is received at its free end in an opening in said second friction pad assembly to permit a degree of limited movement between said second friction pad assembly and said caliper member.

6. A disc brake as claimed in claim 1, wherein said element incorporates resilient means constructed and arranged to permit said second friction pad assembly to transmit drag from one of said abutment surfaces to the other of said abutment surfaces when the brake is applied with the direction of rotation of said disc reversed.

7. A disc brake as claimed in claim 1, wherein said element is located in said drag-taking member, a boss is provided on said caliper member through which said element extends into said drag-taking member, and resilient means act between said element and said boss.

8. A disc brake as claimed in claim 7, wherein said resilient means comprises a bush of resilient material.

9. A disc brake as claimed in claim 8, wherein said bush is sealingly connected to said element by means of sealing boots integral with said bush and disposed on opposite sides of said boss.

10. A disc brake as claimed in claim 7, wherein said element comprises a bolt.

11. A disc brake as claimed in claim 10, wherein said bolt is received within a sleeve and a bush is disposed between said sleeve and said boss.

12. A disc brake as claimed in claim 7, wherein said resilient means comprises at least one annular ring of resilient material.

13. A disc brake as claimed in claim 12, wherein two axially spaced annular rings of resilient material are disposed between said element and said boss.

14. A disc brake as claimed in claim 13, wherein one of said rings is partially received in a groove in said element and the other of said rings is partially received in a groove in said boss.

15. A disc brake as claimed in claim 14, wherein the one of said rings adjacent to said disc is received in said groove in said boss, and the said other ring is received in said groove in said element.

16. A disc brake as claimed in claim 1, wherein resilient means are located between said element and said opening.

17. A disc brake as claimed in claim 1, wherein said element and said coupling are relatively offset.

18. A disc brake as claimed in claim 1, wherein said element and said coupling are relatively offset both radially and circumferentially.

19. A disc brake as claimed in claim 1, wherein each blade spring means is of channel section to embrace opposed sides of a respective one of said arms, and lugs at the ends of said channel sections are bent over to engage opposed ends of said arms.

* * * * *